Patented Sept. 10, 1946

2,407,470

UNITED STATES PATENT OFFICE 2,407,470

BITUMINOUS COMPOSITION CONTAINING MINERAL AGGREGATES

John Frederick Thomas Blott, Worcester Park, and Peter Alexander, London, England, assignors to Shell Development Company, San Francisco, Calif., a corporation of Delaware No Drawing. Application November 14, 1944, Serial No. 563,456. In Great Britain November 15, 1943

2 Claims. (Cl. 106—283)

This invention relates to the manufacture of bituminous compositions containing mineral aggregates suitable for the construction of roads, floors, airfield runways and the like.

It is an object of the present invention to provide compositions of the kind referred to above of improved load-bearing capacities.

Accordingly, with this object in view the present invention provides a process for the manufacture of bituminous compositions wherein water is added to a mineral aggregate of the type which "set" (as hereinafter defined containing less than 3% by weight of water so that the proportion of water is not greater than 6.5% by weight (calculated on the weight of the aggregate), and the thus treated aggregate is mixed with between 3% and 8% by weight (calculated on the weight of the aggregate) of a bituminous binder which will wet the surface of the aggregate only in the absence of water (hereinafter referred to as binders of type 1) at a temperature not exceeding 100° C., the proportion of added water being such that the water content of the composition produced is greater than 3% (calculated on the weight of the aggregate) and the composition being such that on consolidation and exposure to the atmosphere it is capable of losing water by evaporation.

With bituminous binders of type 1 it has hitherto been considered necessary to dry the aggregate before bringing it into contact with the binder and it will thus be seen that the process of the present invention is radically different from the hitherto usual practice.

The present invention also includes a process for the manufacture of bituminous compositions wherein water is added to a mineral aggregate of the type which "set" (as hereinafter defined) containing less than 3% by weight of water so that the proportion of water is not greater than 6.5% by weight (calculated on the weight of the aggregate) and the thus treated aggregate is mixed with between 3% and 8% by weight (calculated on the weight of the aggregate) of a bituminous binder which will wet the surface of the aggregate to a substantial extent in the presence or absence of water (hereinafter referred to as binders of type 2) at a temperature not exceeding 100° C., the proportion of added water being such that the water content of the composition produced is greater than 3% (calculated on the weight of the aggregate).

The term "mineral aggregate of the type which set" as used herein refers to those which become at least feebly cemented together to coherent masses, i. e. "set," when wetted with water, compacted and allowed to dry out by exposure to the atmosphere. Examples of such aggregates are naturally occurring deposits of sands and gravels containing at least small proportions of clay, and clean sands, gravels, and other such granular mixtures, which are inactive in the above respect, to which have been added at least small proportions of fillers which themselves "set" in the above sense. Examples of such fillers are calcium hydroxide, magnesium oxide, Portland cement, ferric oxide, and clays of the montmorillonite type. Fillers such as china clay (Kaolinite), slate dust, precipitated chalk, and limestone dust which by themselves show no appreciable tendency to "set" in the above sense may be rendered suitable, i. e. may be activated, for the process by the addition of small proportions of calcium hydroxide. The proportion of active or activated filler which may be present in the mixture of aggregate and binder must be sufficient to give the aggregate the property of setting in the above sense but is not otherwise limited.

The term "bituminous binder" as used herein includes cutbacks and it will be understood that if desired the binder may be used in the form of an aqueous dispersion or emulsion.

Examples of bituminous binders which may be used in the process of the present invention are petroleum asphalts, residual oils, blends of such asphalts or residual oils with petroleum or coal tar distillates, coal tars, pitches, blends of the same with coal tar distillates. These binders may or may not contain additives to encourage wetting of the aggregate in the presence of water and may be applied at atmospheric temperatures or at any higher temperature provided that the temperature of the mixture with the aggregate does not exceed 100° C.

The best results are obtained in the process of the present invention when the proportion of water present during mixing is from about 4 to 6% (calculated on the weight of the aggregate), although no increase in load-bearing capacity occurs after the percentage of water exceeds about 5%. In cases where the temperature of mixing is high sufficient water must be added to allow for evaporation during mixing and to give the desired final content of water.

The following examples illustrate the advantages of the process of the invention:

In Examples I to IV, mixtures of mineral aggregate, fillers and bituminous binders, with or without the addition of water, were prepared in the laboratory by thorough hand-stirring at atmospheric temperature (20° C.). The mixtures were then consolidated by hand-rolling in moulds 3" x 3" x ¾" and exposed to the atmosphere of the laboratory. A naturally occurring sandy deposit, viz. Buckland sand, which showed no appreciable "set" when wetter with water, compacted, and exposed to the atmosphere, was used in these tests. The grading of the sand was as follows:

| Passing B. S. mesh sieve | Retained B. S. mesh sieve | Per cent weight |
| --- | --- | --- |
| 200 | --- | 0.1 |
| 100 | 200 | 3.5 |
| 85 | 100 | 8.0 |
| 52 | 85 | 58.0 |
| 36 | 52 | 22.5 |
| 25 | 36 | 6.0 |
| 18 | 25 | 1.5 |
| 10 | 18 | 0.4 |

The binders used in these examples consisted of petroleum cutbacks having a viscosity of 40/50 secs. measured by the modified redwood tar viscometer at 25° C. in each case. One of these represented binders of type 1, and the other, when used in conjunction with calcium hydroxide, represented binders of type 2.

The load-bearing capacities of the samples of consolidated mixtures after various periods of exposure were compared by determining the extent of penetration of a 90° metal cone into the material under a load of 2 kgs. applied for 1 minute. For the purposes of comparison, the load-bearing capacity is considered to be given by:

$$\text{Load-bearing capacity} = \frac{\text{Load on cone}}{\pi x (\text{depth of penetration})^2}$$

These values are expressed as kgs./cm$^2$.

Example I

*Influence of water and calcium hydroxide with binder of type 1*

| | Composition, as parts by weight, mixture No. | | | |
| --- | --- | --- | --- | --- |
| | 1 | 2 | 3 | 4 |
| Buckland sand | 100 | 100 | 100 | 100 |
| Calcium hydroxide | --- | 2 | 2 | --- |
| Water | --- | --- | 6.5 | 6.5 |
| Binder of type 1 | 5.5 | 5.5 | 5.5 | 5.5 |

| Mixture No. | Load-bearing capacity after exposure for— | | |
| --- | --- | --- | --- |
| | 1 day | 7 days | 28 days |
| | Kgs./cm.$^2$ | Kgs./cm.$^2$ | Kgs./cm.$^2$ |
| 1 | 0.4 | 0.5 | 0.6 |
| 2 | 0.8 | 1.0 | 1.4 |
| 3 | 2.3 | 3.1 | 3.1 |
| 4 | 3.1 | 2.1 | 0.6 |

These examples demonstrate the benefits due to the presence of water in conjunction with an activating filler. The result with Mix No. 4 shows that water alone with an inactive aggregate gives no advantage after exposure for some days.

Example II

*Influence of water and calcium hydroxide with binder of type 2*

| | Composition, as parts by weight, mixture No. | |
| --- | --- | --- |
| | 5 | 6 |
| Buckland sand | 100 | 100 |
| Calcium hydroxide | 2 | 2 |
| Water | --- | 6.5 |
| Binder of type 2 | 5.5 | 5.5 |

| Mixture No. | Load-bearing capacity after exposure for— | | |
| --- | --- | --- | --- |
| | 1 day | 7 days | 28 days |
| | Kgs./cm.$^2$ | Kgs./cm.$^2$ | Kgs./cm.$^2$ |
| 5 | 0.8 | 0.8 | 0.9 |
| 6 | 2.3 | 2.5 | 2.8 |

The benefit due to the presence of water and calcium hydroxide is demonstrated by these results.

Example III

*Influence of water and active fillers with binder of type 1*

Further examples with a binder of type 1 are given below where Portland cement and Kimmeridge clay are used as activating fillers.

| | Composition, as parts by weight, mixture No. | | | |
| --- | --- | --- | --- | --- |
| | 7 | 8 | 9 | 10 |
| Buckland sand | 100 | 100 | 100 | 100 |
| Portland cement | 2 | 2 | --- | --- |
| Kimmeridge clay | --- | --- | 2 | 2 |
| Water | --- | 4 | --- | 4 |
| Binder of type 1 | 4 | 4 | 4 | 4 |

| Mixture No. | Load-bearing capacity after exposure for— | | |
| --- | --- | --- | --- |
| | 1 day | 7 days | 28 days |
| | Kgs./cm.$^2$ | Kgs./cm.$^2$ | Kgs./cm.$^2$ |
| 7 | 0.6 | 0.7 | 0.8 |
| 8 | 3.0 | 3.1 | 4.0 |
| 9 | 0.9 | 1.1 | 1.4 |
| 10 | 2.4 | 2.6 | 3.1 |

Example IV

*Activation of inert filler*

Examples of the activation with calcium hydroxide of a filler (china clay), which itself is inert from the present point of view, are given below:

| Composition, as parts by weight, mixture No. | | | | |
|---|---|---|---|---|
| | 11 | 12 | 13 | 14 |
| Buckland sand | 100 | 100 | 100 | 100 |
| China clay | 2 | 2 | 1.75 | 1.75 |
| Calcium hydroxide | | | 0.25 | 0.25 |
| Water | | 4 | | 4 |
| Binder of type 1 | 4 | 4 | 4 | 4 |

| Mixture No. | Load-bearing capacity after exposure for— | | |
|---|---|---|---|
| | 1 day | 5 days | 36 days |
| | $Kgs./cm.^2$ | $Kgs./cm.^2$ | $Kgs./cm.^2$ |
| 11 | 0.7 | 0.9 | 1.2 |
| 12 | 1.4 | 0.9 | 1.2 |
| 13 | 0.7 | 1.1 | 1.6 |
| 14 | 1.5 | 1.7 | 3.0 |

EXAMPLE V

*Influence of water with various proportions of activated filler*

In these examples, a sand fraction all passing the 18 B. S. mesh sieve and retained by the 25 B. S. mesh sieve was used in place of Buckland sand.

| Composition, as parts by weight, mixture No. | | | | | | |
|---|---|---|---|---|---|---|
| | 15 | 16 | 17 | 18 | 19 | 20 |
| 18/25 B. S. mesh sieve fraction | 100 | 100 | 100 | 100 | 100 | 100 |
| China clay | 5 | 10 | 15 | 5 | 10 | 15 |
| Calcium hydroxide | 2 | 2 | 2 | 2 | 2 | 2 |
| Water | | | | 5 | 5 | 5 |
| Binder of type 2 | 7 | 7 | 7 | 7 | 7 | 7 |

| Mixture No. | Load-bearing capacity after exposure for— | | |
|---|---|---|---|
| | 1 day | 10 days | 30 days |
| | $Kgs./cm.^2$ | | |
| 15 | 0.2 | Increasing slightly. | |
| 16 | 0.6 | Do. | |
| 17 | 3.8 | Do. | |
| 18 | 1.5 | 2.8 $Kgs./cm.^2$ | 3.9 $Kgs./cm.^2$ |
| 19 | 2.8 | 5.4 $Kgs./cm.^2$ | 8.0 $Kgs./cm.^2$ |
| 20 | 6.3 | 13.0 $Kgs./cm.^2$ | |

The above results demonstrate the very great benefits due to the initial presence of water when the proportion of activated filler present is high.

EXAMPLE VI

*Tests with out-door exposure*

The following examples are quoted from trials made out-of-doors with Dorking sand. This sand showed the following grading:

| Passing, B. S. mesh sieve | Retained, B. S. mesh sieve | Per cent weight |
|---|---|---|
| 200 | | 6.0 |
| 100 | 200 | 10.0 |
| 85 | 100 | 2.5 |
| 52 | 85 | 24.5 |
| 36 | 52 | 35.5 |
| 25 | 36 | 14.5 |
| 18 | 25 | 5.0 |
| 10 | 18 | 2.0 |

The mixtures were mixed at atmospheric temperature (18° C.) with the binders at 80° C. in a power-driven mixer of 2 cwts. capacity. The mixtures were laid and consolidated to a thickness of about 4″ by rolling and exposed to the weather during the month of July 1943.

| Composition, as parts by weight, mixture No. | | | | |
|---|---|---|---|---|
| | 21 | 22 | 23 | 24 |
| Dorking sand | 100 | 100 | 100 | 100 |
| Calcium hydroxide | 2 | 2 | 2 | 2 |
| Water | | 5 | | 5 |
| Binder of type 1 | 5.8 | 5.8 | | |
| Binder of type 2 | | | 6.2 | 6.2 |

| Mixture No. | Load-bearing capacity after exposure for— | | |
|---|---|---|---|
| | 1 day | 5 days | 21 days |
| | $Kgs./cm.^2$ | $Kgs./cm.^2$ | $Kgs./cm.^2$ |
| 21 | 1.6 | 2.8 | 6.9 |
| 22 | 8.5 | 11.2 | 17.0 |
| 23 | 1.2 | 1.8 | 5.0 |
| 24 | 2.8 | 6.9 | 11.2 |

Although rain fell at various times during the period of exposure the results show that even with binder of type 1, a satisfactory improvement in load-bearing capacity due to the initial presence of water was obtained.

We claim:

1. A process for the preparation of bituminous compositions of improved load-bearing capacities, which comprises mixing a sand containing less than 3% by weight of water with water employed in such an amount that the total water content is not greater than 6.5% by weight of the sand, mixing the thus treated sand with between about 4% and about 6% by weight, as calculated on the weight of the sand, of a bituminous material capable of wetting the surfaces of the sand particles only in the absence of water and with about 2% by weight of calcium hydroxide, and effecting said last-mentioned mixing at a temperature of below about 100° C., the amount of water added to the sand being also such that the total water content is greater than 3% by weight of the composition obtained after incorporation of the bituminous material.

2. A process for the preparation of bituminous compositions of improved load-bearing capacities, which comprises mixing a mineral aggregate containing less than 3% water and capable of becoming at least feebly cemented together when wetted, compacted and allowed to dry, with water employed in such an amount that the total water content is not greater than 6.5% by weight of the mineral aggregate, mixing said treated aggregate with between about 3% and about 8% by weight, as calculated on the weight of the aggregate, of a bituminous material capable of wetting the surfaces of said aggregate, and effecting said last-mentioned mixing at a temperature of below about 100° C., the amount of water added to the mineral aggregate being also such that the total water content is greater than 3% by weight of the composition obtained after incorporation of the bituminous material.

JOHN FREDERICK THOMAS BLOTT.
PETER ALEXANDER.